United States Patent [19]

Bergvall

[11] 4,370,938

[45] Feb. 1, 1983

[54] ELECTRONIC SEWING MACHINE WITH STITCH CONTROL DEPENDENT ON SEWING MATERIAL

[75] Inventor: Bengt A. Bergvall, Huskvarna, Sweden

[73] Assignee: Husqvarna Aktiebolag, Huskvarna, Sweden

[21] Appl. No.: 216,929

[22] Filed: Dec. 16, 1980

[30] Foreign Application Priority Data

Dec. 11, 1979 [SE] Sweden ................................ 7910201

[51] Int. Cl.³ .............................................. D05B 3/02
[52] U.S. Cl. .................................................. 112/158 E
[58] Field of Search ........... 112/158 E, 158 F, 121.11, 112/121.12, 272

[56] References Cited

U.S. PATENT DOCUMENTS

| 4,142,473 | 3/1979 | Itoh | 112/158 E |
| 4,166,423 | 9/1979 | Brienza et al. | 112/158 E X |
| 4,216,732 | 8/1980 | Marsh et al. | 112/158 E |
| 4,236,467 | 12/1980 | Tanaka et al. | 112/158 E |
| 4,248,168 | 2/1981 | Hoffman | 112/158 E |

*Primary Examiner*—Peter P. Nerbun
*Attorney, Agent, or Firm*—Alfred E. Miller

[57] ABSTRACT

A sewing machine has a pattern selection device and a seam memory for supplying stitch data for a needle positioning mechanism and a feeder mechanism. The pattern selection means includes a control switch adapted to be set in accordance with the type of cloth to be sewn. On basis of information input via the control switch and preprogramming of the memory, that seam data is chosen which is most suitable to the selected type of cloth and a selected sewing operation.

7 Claims, 9 Drawing Figures

ELECTRONIC SEWING MACHINE WITH STITCH CONTROL DEPENDENT ON SEWING MATERIAL

This invention relates to an arrangement in sewing machines for selecting a seam in dependence upon the cloth quality and the function of the seam, and is especially directed to a built-in sewing guide for sewing machines having pattern selection means and a seam memory for the supply of stitch data to the stitch forming elements of the machine.

Within the art of electronic pattern data circuits for sewing machines, several systems have been developed for the generation of control signals. Such a typical system may, for instance, be comprised of a memory unit in which patterns are stored, so that every position of the needle in the transverse direction corresponds to a digital code word in the memory. Circuits of this kind must include an address counter in order to make the addressing of the successive needle position run forward. The counter is stepped by pulses in synchronism with the running of the machine. The address counter is supplied with the address (start address) of the selected pattern. Such a start address is carried out by an input selector, e.g. a set of change-over switches, and a logic circuit for supplying a digital input signal to an address memory or the like. The address counter then releases code words for each of the following stitches out of the memory, as the fancy seam is sewn. The input selector may be a set of change-over switches or the like and has, in known systems, a row of symbols showing the seam the machine will sew, when a switch referred to a certain symbol is actuated. The choice between several symbols, and occasionally other controls, must be done by the operator with the aid of a manual and his own knowledge. Because of this there may be a hesitation in the operation of the machine, since the question of cloth quality, the fitness of the several seams etc. can be difficult to answer.

It is therefore desirable to provide an electronic system for facilitating the seam choice and making it always the same for the same type of cloth and seam character (sewing operation), such as sew together, overlock, hem etc.

In accordance with the present invention a system is provided in which the input information is supplied by the operator directly on the basis of text and symbols on the machine, by means of push buttons, etc. indicating the information. Proceeding from this information, the data system selects one or more seams that is most proper for the combination of cloth and sewing operation made by the operator. In other words, the system is pre-programmed with regard to the most proper seam for the operator's selection. These seams are empirically tested for a lot of different types of cloth and sewing operations and stored in the memory. When the operator has adjusted the push buttons, controls, etc. on basis of the text and symbols, the stitch code is supplied for the empirically tested seam, especially made for that material and the operation for which the adjustment is made. The advantage of such a system is that the operator does not need to adjust the cloth feeding, stitch bight, right or left position etc., but only to select the symbols and text according to the type of cloth and operation in question.

In order that the invention will be more clearly understood, it will now be disclosed in greater detail, with reference to the accompaying drawings, wherein.

Figure 1:
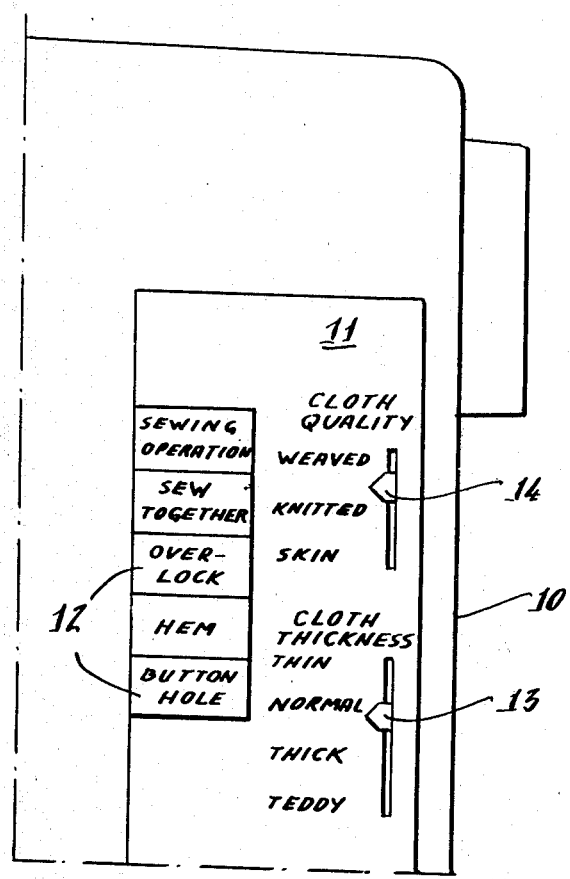
FIG. 1 is a simplified illustration of a control panel having pattern selecting means, for a sewing machine, in accordance with one embodiment of the invention.
Figure 3:
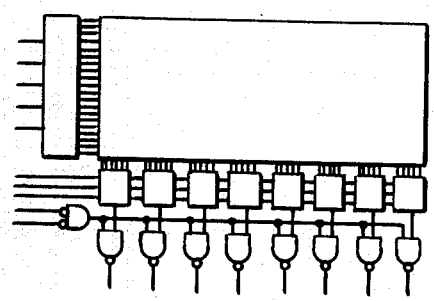
FIG. 3 is a block diagram of an integrated circuit type 74 S271, which may be employed as the start address memory of the system of FIG. 2, to which the input selector is connected.
Figure 4:
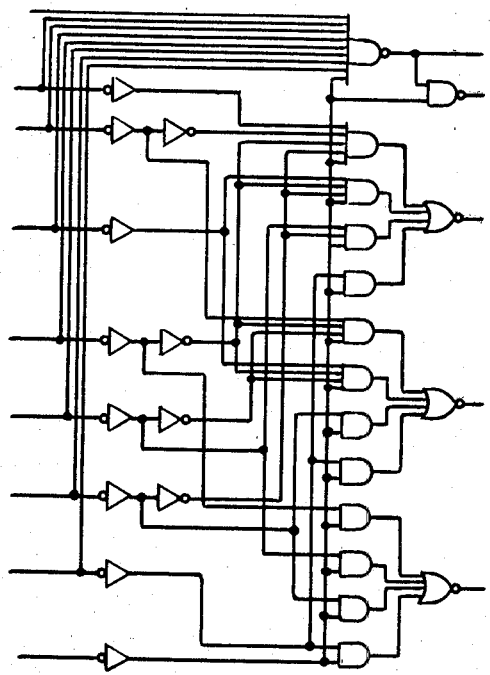
FIG. 4 is a block diagram of an integrated circuit type 74148, which may be employed as the encoder of the circuit of FIG. 2.

Referring now to FIG. 1, a panel 11 is mounted on a post 10 of a sewing machine, and serves as a carrier for a set of push buttons 12 and a couple of controls 13, 14. These buttons and controls are used for transferring a certain selection of seam to the electronics in the machine, e.g. the controls may be used for pre-adjustment on a certain series of seam patterns, e.g. utility seams of which at least one can be selected on the button 12. When the operator pushes such a button, a so-called seam selection code is generated and fed to a so-called start address memory. The procedure of generating such a code is hereby explained with reference to FIG. 2.

Figure 2:
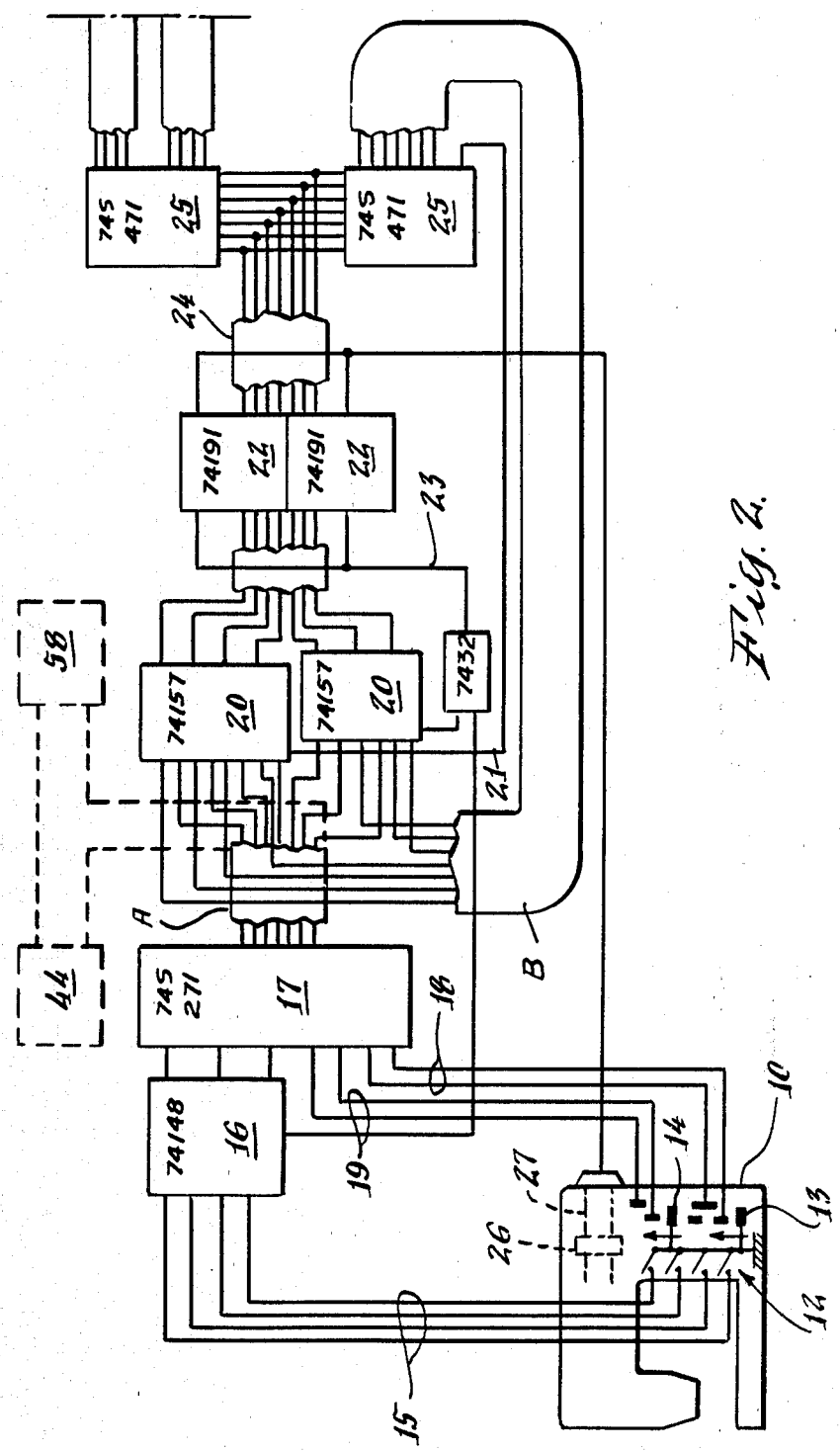
FIG. 2 is a block diagram of a control system for a sewing machine, in accordance with the invention.
Figure 5:
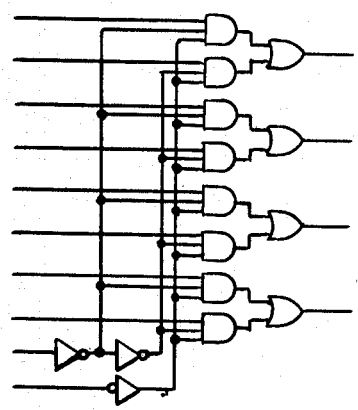
FIG. 5 is a block diagram of an integrated circuit type 74157, which may be employed as the address selector of the electronic system of FIG. 2.
Figure 6:
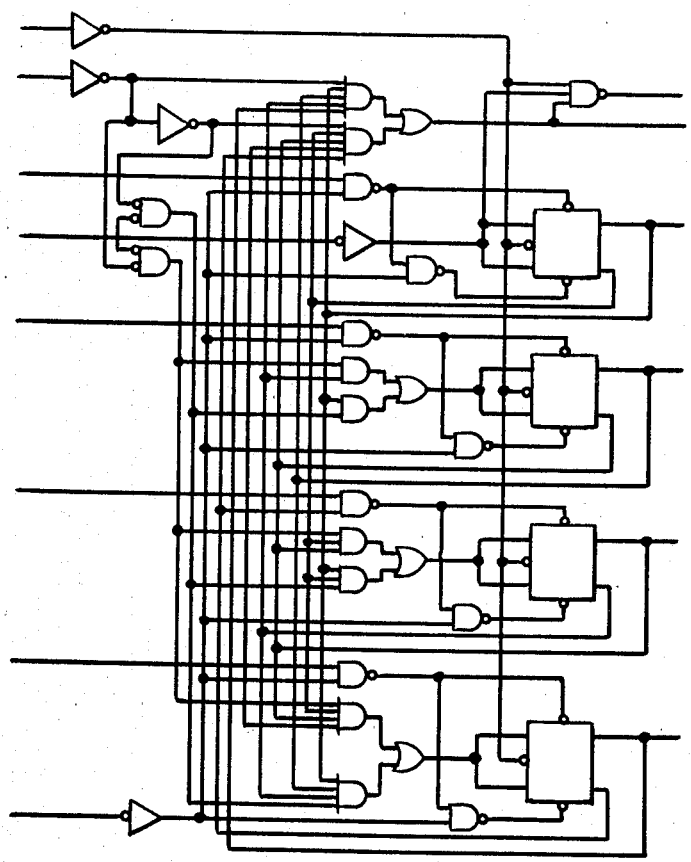
FIG. 6 is a block diagram of an integrated circuit type 74191, which may be employed as a counter in the system of FIG. 2.

In the electronic system the essential functional units are interconnected as shown in FIG. 2 and operate in the following manner:

When the operator pushes a button 23, one of the inputs 15 of an encoder 16 is grounded and a unique 3-bit code is fed to the start address memory 17. This memory 17 also has a pair of 2-bit inputs 18, 19 from the controls 13, 14 which together with the said 3-bit code provide the input information for the system. The controls 13, 14 are a pair of change-over switches which multiply the number of possible combinations. Assuming, e.g. four positions on the control 13 and three on the control 14, 4×3=12 different series are obtained, each one of which may be selected in combination with those four seams as indicated on the buttons 12 in the illustrated arrangement. As described by the test on the panel the parameter "Sewing operation" refers to the buttons 12, the parameter "Cloth quality" to the control 14 and the parameter "Cloth thickness" to the control 13. The operator starts with the adjustments of the controls 13, 14 and sets them in accordance with the material to be sewn. The sewing operation the machine is to perform is then determined by actuation of the buttons 12, for instance, for the operation "hemming" the button "Hem" is depressed.

The input information releases an address word in the start address memory, which is conditioned by all the three parameters, i.e. in the illustrated embodiment not only the sewing pattern but also the cloth quality and thickness. A wire group A applies this address word to the A-inputs of an address selector 20. If no shift signal is present on the select input 21 of the selector, the word passes the selector and is applied to an address counter 22. This counter is pre-settable so that the word sets the counter to a digital number represented by the word, when a trigger signal is present on a triggering input 23. The address word proceeds via a group 24 of conductors to a read memory 25, where the word addresses the memory cell that stores the stitch code of the first stitch of the selected seam. A very large number of stitch codes are stored in the read memory, since every combination on the buttons and controls requires a determined storing space. The stitch code is fed to a code converter and driving circuits for the zig-zag and cloth feeding mechanisms (not shown). The second stitch code, following the first one, is determined by another address word supplied by the address counter. This second word is controlled by a position indicator 26 at the arm shaft 27, by means of a pulse which is generated, by conventional means at the moment the needle is positioned above the cloth. The number produced on the counter is added by a logic "one" for very such pulse, whereby another binary number is produced to form the address word of the next stitch code. The counter thus steps after every revolution of the machine, to effect the transfer of the address of the next stitch code to the stitch memory. This is a usual principle for feeding successive code words from a memory and hence a more complete description of the procedure is not necessary. Also the repetition of a procedure by using a back-jump in the counter by means of its inputs B and the trigger input 22 can be made by using well-known prior art teachings with the use of standard circuits.

A "cloth control" is introduced into the adjustment means due to the fact that different textures or qualities of sewing material require quite different adjustments on the machine, even if the same sewing operation is selected. For example, the slippage of terry cloth against the cloth feeder is quite different from the slippage of plastic cloth when the cloth control is adjusted as a function of the cloth texture and thickness, a seam is produced defined by a start address word with data (bight and feed) which empirically has been determined to be suitable of the material in question. Stitch codes of such seams are programmed in the stitch memory in advance, and the start address word sets the counter to select that seam. When the selection of another texture or another operation is made, the address word corresponding to such selection is produced to generate the codes of the other seam etc. Many cloth qualities and thicknesses are similar in sewing and may be classified under a common start address word. This enables a reduction of the number of seams programmed in the stitch memory.

As examples of sewing operations the words "Sew together", "Overlock", "Hem" and "Button hole" are illustrated on the drawing showing the embodiment of the panel, and as examples of cloth textures the words "Weaved", "Knitted", "Skin" are used. These words shall only be considered to be examples only, since, in fact there may be more and other words used at further adjustments on the controls.

Figure 7:
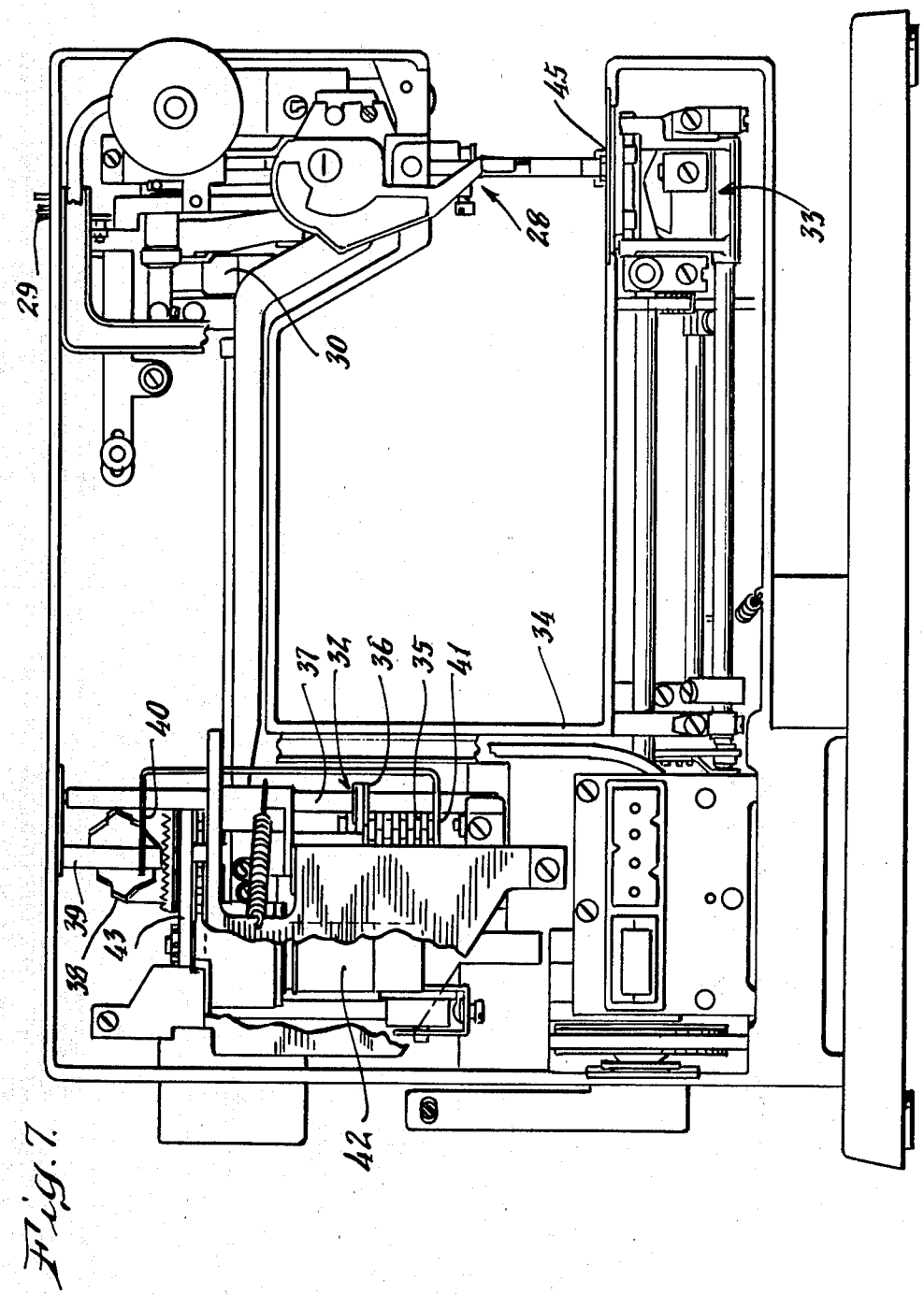
FIG. 7 is a side view, with the side panels removed, of a mechanically operating sewing machine embodying the invention.
Figure 8:
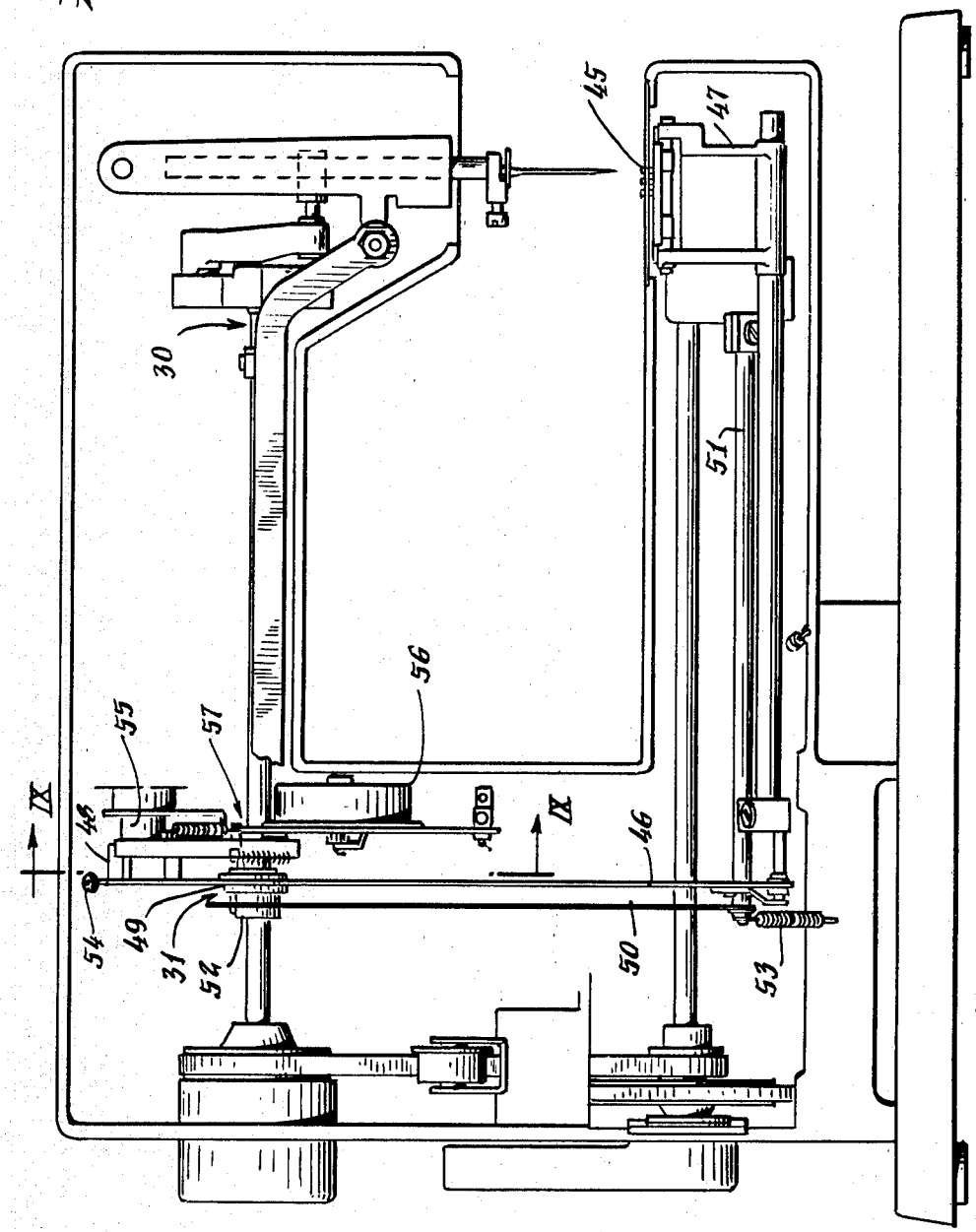
FIG. 8 is a simplified side view of the sewing machine of FIG. 7, showing further details of the machine.
Figure 9:
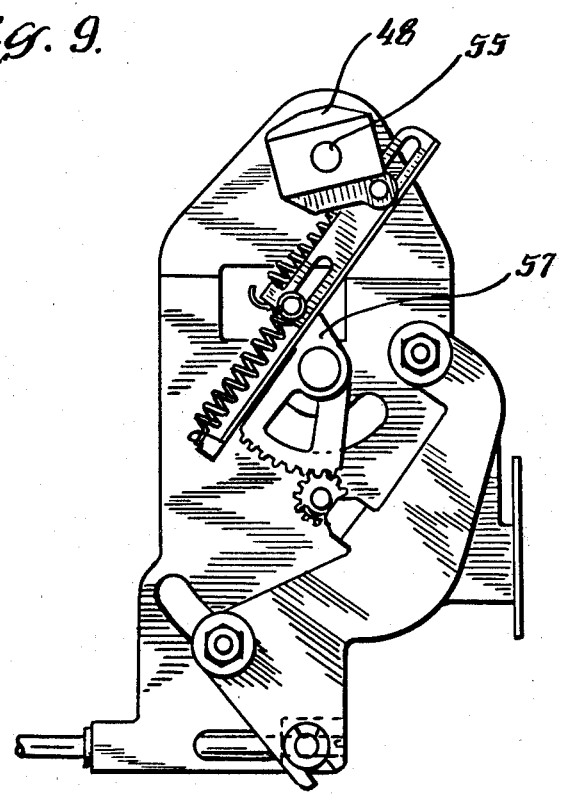
FIG. 9 is a section view of the machine of FIG. 8 taken along the lines IX—IX.

The sewing machine described above has electronic control of the needle and feeder movements, but the invention could also be applied to mechanically controlled sewing machines. Such a machine is shown in FIGS. 7 and 8, where the rear wall of the machine is removed. It comprises portions principally known by conventional designs, but for simplicity, mechanisms are, in this embodiment, integrated into functional units. These are as follows: Presser bar and needle bar 28, thread tensioning device 29, upper arm assembly 30, stitch length arrangement 31, zig-zag device 32, a lower arm assembly and a shuttle mechanism 33. The zig-zag device 32 is positioned in the post 34 of the machine and comprises cam discs 35 of a plurality of seams. The discs are scanned by a cam follower 36, which is journalled and vertically displaceable on a shaft 37. Its vertical position is controlled by an axial curve 39, which is journalled on a second vertical shaft 39 on which the cam discs 35 driven by a miter gear (not shown) also are journalled. The axial curve is scanned by a curve follower lower 40, which vertically guides the cam follower 36 against the force of a spring 41.

The setting of the zig-zag device on the several seams is effected by stepping motor 42, which is connected to the axial curve 38 by means of a belt gearing 43. The stepping motor has a plurality of distinct positions during each revolution, and is driven by pulses from a special drive unit 44. The axial curve is thereby given a rotating movement which is a multiple of the angle between two such distinct positions. The axial curve is thus rotated stepwise, and the turning from one step to the next effects a displacement of the follower 36 from one cam disc to another.

In the lower arm, a feeder 45 is arranged as in a conventional sewing machine. It performs a rectangular movement, a horizontal movement and a vertical movement. The horizontal movement is achieved by a link system 46, 47 (FIG. 8), a controllable cullis 48 and an eccentric drive member 49 on the upper arm shaft. The vertical movement is constant and achieved by a link syustem 50, 51 and another eccentric drive member 52 having an upward movement. The return movements of the links are effected by means of springs 53, 54.

The adjustable cullis 48, shown in FIG 8, is journalled by means of a shaft 55. The adjustment is made of a stepping motor 56 and a movement transferring arrangement 57. The stepping of the motor is effected by drive pulses applied by a drive unit 58 in the same way as for the motor 42. The transferring arrangement 57 has a special design, which does not here require any explanation. The function thereof is related to the transferring of torsional angles from the stepping motor to the culins, which in its turn controls the magnitude of the feed movement in a way known per se.

The drive units 44, 58 comprise control electronics for the stepping motors and are comprised primarily of binary counters connected to receive binary codes at their inputs and to supply output pulse trains corresponding to the binary codes. The motor responds to every pulse by moving one step. This technique is known per se. The binary code to be used is produced in a manner similar to that of the start address words discussed in the description of FIG. 2. The code is produced in the start address memory 17 in dependence of the three parameters sewing operation, cloth quality and thickness and is supplied as a start address word on the conductor group A. The other part of FIG. 2, i.e. to the right of the group A, is excluded, and the drive units 44, 58, the stepping motors 42, 56 and mechanical gears as described above are substituted therefore. The sewing machine of this embodiment is a combination of electronic adjusting and converting circuity and mechanical memories and control mechanism associated therewith.

It may be apparent from the foregoing that the invention is not limited to the one or the other type of a sewing machine but may be applicable to all types, electronic as well as mechanical sewing machines and also combinations thereof.

What is claimed is:

1. In a sewing machine having a needle positioning mechanism, a cloth feeder, input means adapted to be adjusted by an operator, means for controlling the needle positioning mechanism to provide transverse movement of a needle and for controlling movements of the cloth feeder for providing determined seam patterns on a sewing material, and a memory unit connected to control said controlling means as a function of adjustments on said input means; the improvement wherein said input means comprises means for producing address signals in accordance with the setting thereof, means applying said address signals to said memory unit whereby said memory unit produces output signals in accordance with pre-programmed data therein for controlling said controlling means in accordance therewith, and further means for stepping the address signal output of said input means in dependence upon the completion of operations of said controlling means, the data stored in said memory unit including data relating to the empirically best stitch characteristics for different thicknesses and textures of said sewing material, whereby said input means may be set in accordance with said thickness and texture for the automatic adjustment of said seam.

2. In a sewing machine having a needle positioning mechanism, a cloth feeder, input means adapted to be adjusted by an operator, means for controlling the needle positioning mechanism to provide zig-zag movement of a needle thereon and for controlling movements of the cloth feeder for providing seam patterns on a sewing machine, and a memory unit connected to control said controlling means in dependence of adjustments on said input means; the improvement wherein said input means comprises first and second input adjusting means, the first setting means being settable in accordance with a desired sewing operation and the second setting means being settable to select separately and independently the texture and thickness of said sewing material, said memory unit having data stored therein for controlling said controlling means for stitching in accordance with the setting of said first and second adjusting means.

3. The sewing machine of claim 2 further comprising means cooperatively positioned with respect to said adjusting means for indicating the texture or thickness of said sewing material corresponding to the settings of said adjusting means.

4. The sewing machine of claim 2 further comprising means cooperatively positioned with respect to said first adjusting means for indicating the sewing operation corresponding to the settings thereof.

5. The sewing machine of claim 2 wherein said input means comprises means producing a digital signal corresponding to the setting thereof, and further comprising means addressing said memory unit in accordance with said digital signals.

6. The sewing machine of claim 2 wherein said input means comprises means producing analog signals corresponding to the setting thereof, and further comprising means applying said analog signals to said memory unit.

7. The sewing machine of claim 2 wherein said input means comprises means for producing a signal for addressing said memory unit in accordance with the setting of said input means.

* * * * *